United States Patent [19] [11] Patent Number: 4,857,591
Eichenauer et al. [45] Date of Patent: Aug. 15, 1989

[54] THERMOPLASTIC MOULDING COMPOSITIONS OF ABS AND HYDROGENATED NITRILE RUBBER

[75] Inventors: Herbert Eichenauer; Hartmuth Buding, both of Dormagen; Joachim Döring, Cologne; Rudolf Casper; Karl-Heinz Ott, both of Leverkusen, all of Fed. Rep. of Germany

[73] Assignee: Bayer Aktiengesellschaft, Leverkusen, Fed. Rep. of Germany

[21] Appl. No.: 65,024

[22] Filed: Jun. 22, 1987

[30] Foreign Application Priority Data

Jul. 2, 1986 [DE] Fed. Rep. of Germany ....... 3622208

[51] Int. Cl.$^4$ .................. C08L 37/00; C08L 51/00
[52] U.S. Cl. ............................. 525/74; 525/77; 525/80; 525/83
[58] Field of Search ............. 525/83, 74, 77, 80

[56] References Cited

U.S. PATENT DOCUMENTS 4,350,796 9/1982 Oyama et al. ................ 525/235

FOREIGN PATENT DOCUMENTS 0129796 1/1985 European Pat. Off. ........... 525/83
0129815 1/1985 European Pat. Off. ........... 525/83

Primary Examiner—Jacob Ziegler
Attorney, Agent, or Firm—Connolly and Hutz

[57] ABSTRACT

Thermoplastic moulding compositions consisting of
I. 75 to 99.5% by weight of a polymer of
A. 0 to 95% by weight, 95% or less by weight; of a graft copolymer prepared by grafting polymerization of
A.1 5 to 95% by weight of a mixture of
A.1.1 50 to 95% by weight of styrene, α-methylstyrene, nuclear-substituted styrene, methyl methacrylate or mixtures thereof and
A.1.2 50 to 5% by weight of (meth)acrylonitrile, methyl methacrylate, maleic anhydride, N-substituted maleimide or mixtures thereof on
A.2 95 to 5% by weight of a rubber with a glass transition temperature Tg or <0°C., and
B. 100 to 5% by weight of a thermoplastic polymer of
B.1 95 to 50% by weight of styrene, α-methylstyrene, nuclear-substituted styrene or methyl methacrylate or mixtures thereof and
B.2 5 to 50% by weight of (meth)acrylonitrile, methyl methacrylate, maleic anhydride, N-substituted maleimide or mixtures thereof and
II. 25 to 0.5% by weight of a hydrogenated nitrile rubber.

4 Claims, No Drawings

THERMOPLASTIC MOULDING COMPOSITIONS OF ABS AND HYDROGENATED NITRILE RUBBER

Mixtures of thermoplastic resins with nitrile rubbers are known (compare DE-AS (German Published Specification) 1,053,779); mixtures of graft rubbers, thermoplastic resins and nitrile rubbers have also been described (compare, for example, EP-A 0,129,796 and and EP-A 0,129,815).

Mouldings produced from these mixtures have a good toughness; other properties, such as surface gloss and processability, however, are unsatisfactory.

It has been found that mixtures of resin-modified rubbers and hydrogenated nitrile rubber are very tough, especially at low temperatures, and have a good surface gloss and excellent thermoplastic processability.

The invention relates to thermoplastic moulding compositions of

I. 75 to 99.5% by weight, preferably 80 to 99% by weight and particularly preferably 85 to 98.5% by weight (based on in the moulding compositions) of a polymer of A. 0 to 95% by weight, 95% or less by weight preferably 5 to 80% by weight (based on (A+B)), of a graft copolymer prepared by grafting polymerization of A.1 5 to 95% by weight, preferably 10 to 80% by weight (based on $A_1+A_2$), of a mixture of A.1.1 50 to 95% by weight (based on A1.1+A1.2) of styrene, -methylstyrene, nuclear-substituted styrene, methyl methacrylate or mixtures thereof, A.1.2 50 to 5% by weight (based on A.1.1+A.1.2) of (meth)-acrylonitrile, methyl methacrylate, maleic anhydride, N-substituted maleimide or mixtures thereof, on A.2 95 to 5% by weight, preferably 90 to 20% by weight (based on A.1+A.2), of a rubber with a glass transition temperature $T_g < 0°$ C. and B. 100 to 5% by weight, preferably 95 to 20% by weight (based on A+B), of a thermoplastic polymer of B.1 95 to 50% by weight (based on B.1+B.2) of styrene, α-methylstyrene, nuclear-substituted styrene or methyl methacrylate or mixtures thereof and B.2 5 to 50% by weight (based on B.1+B.2) of (meth-)acrylonitrile, methyl methacrylate, maleic anhydride, N-substituted maleimide or mixtures thereof and II. 25 to 0.5% by weight, preferably 20 to 1% by weight and particularly preferably 15 to 1.5% by weight (based on the moulding compositions), of a hydrogenated nitrile rubber.

Examples of rubbers which are suitable for the graft polymers A are polybutadiene, butadiene/styrene copolymers with up to 30% by weight of a lower alkyl ester of acrylic or methacrylic acid (for example methyl acrylate, methyl acrylate, butyl acrylate, methyl methacrylate and ethyl methacrylate), polyisoprene and polychloroprene, and alkyl acrylate rubbers based on $C_1-C_8$alkyl acrylates, in particular ethyl, butyl and ethylhexyl acrylate. If appropriate, the alkyl acrylate rubbers can contain up to 30% by weight of copolymerized monomers, such as vinyl acetate, acrylonitrile, styrene, methyl methacrylate or vinyl ether, and/or smaller amounts (up to 5% by weight) of ethylenically polyunsaturated monomers with a crosslinking action. Such are, for example, alkylene diol di(meth)-acrylates, polyester di(meth)acrylate, divinylbenzene, trivinylbenzene, triallyl cyanurate, allyl (meth)acrylate, butadiene and isoprene. Alkyl acrylate rubbers are known. Suitable alkyl acrylate rubbers are also those which contain a core of crosslinked diene rubber (for example of one or more conjugated dienes, such as polybutadiene or a copolymer of a conjugated diene with an ethylenically unsaturated monomer, such as styrene and/or acrylonitrile) with a shell of one of the alkyl acrylate rubbers described above.

The graft copolymers (A) contain 5 to 95% by weight, in particular 20 to 90% by weight, of rubber and 95 to 5% by weight, in particular 90 to 20% by weight, of graft-copolymerized monomers. The rubbers are present in these graft copolymers in the form of at least partly crosslinked particles with an average particle diameter ($d_{50}$) of 0.05 to 5 μm, in particular 0.1 to 1 μm. These graft copolymers can be prepared by free radical copolymerization of styrene, α-methylstyrene, nuclearsubstituted styrene, (meth)acrylonitrile, methyl methacrylate, maleic anhydride or N-substituted maleimide in the presence of the rubbers. Preparation processes for such graft copolymers are emulsion, solution, bulk or suspension polymerization.

The copolymers (B) can be built up from the grafting monomers for (A) or similar monomers. They are, preferably, copolymers of 95 to 50% by weight of styrene, α-methylstyrene, methyl methacrylate or mixtures thereof with 5 to 50% by weight of acrylonitrile, methacrylonitrile, methyl methacrylate, maleic anhydride or mixtures thereof. Such copolymers are also formed as byproducts during the grafting copolymerization. It is usual for separately prepared copolymers also to be admixed in addition to the copolymers contained in the graft polymer. These do not have to be identical chemically to the non-grafted copolymer contents present in the graft polymers.

Suitable separately prepared copolymers are resinous, thermoplastic and free from rubber; they are, in particular, copolymers of styrene and/or α-methylstyrene with acrylonitrile, if appropriate mixed with methyl methacrylate.

Particularly preferred copolymers consist of 20 to 40% by weight of acrylonitrile units and 80 to 60% by weight of styrene or α-methylstyrene units. Such copolymers are known and can be prepared, in particular, by free radical polymerization, in particular by emulsion, suspension, solution or bulk polymerization. The copolymers preferably have molecular weights of 15,000 to $2 \times 10^5$.

Preferred hydrogenated nitrile rubbers (II) in the context of the invention are products which have been obtained by hydrogenation of random copolymers of 90 to 45% by weight, preferably 85 to 50% by weight and in particular 82 to 52% by weight, of at least one conjugated diene, 10 to 55% by weight, preferably 15 to 50% by weight and in particular 18 to 48% by weight, of at least one unsaturated nitrile and 0 to 10% by weight, preferably 0 to 8% by weight, of at least one other monomer which can be copolymerized with conjugated dienes and unsaturated nitriles.

Examples of possible conjugated dienes are buta-1,3-diene, 2-methylbuta-1,3-diene, 2,3-dimethylbuta-1,3-diene and penta-1,3-diene, and suitable unsaturated nitriles are acrylonitrile and methacrylonitrile.

Other possible monomers are vinyl-aromatics, (meth-)acrylic acid esters with 1 to 12 carbon atoms in the alcohol component and α,β-unsaturated mono- or dicarboxylic acids.

Examples which may be mentioned are: for the vinyl-aromatics styrene, substituted styrene, such as o-, m- or p-methylstyrene, ethylstyrene and furthermore vinylnaphthalene and vinylpyridine, for the (meth)acrylic acid esters methyl (meth)acrylate, ethyl (meth)acrylate, n-butyl (meth)acrylate, 2-ethylhexyl (meth)acrylate and 2-hydroxypropyl (meth)acrylate, and for the unsaturated carboxylic acids, $\alpha,\beta$-unsaturated monocarboxylic acids with 3 to 5 carbon atoms, such as acrylic acid, methacrylic acid and crotonic acid, and $\alpha,\beta$-unsaturated dicarboxylic acids with 4 to 5 carbon atoms, such as maleic, fumaric, citraconic and itaconic acid, and furthermore the half-esters of $\alpha,\beta$-unsaturated dicarboxylic acids, such as maleic acid n-dodecyl half-ester or fumaric acid n-butyl half-ester.

Other possible copolymerizable compounds are: vinyl chloride, vinylidene chloride, N-methylolacrylamide, vinyl alkyl ethers with 1 to 4 carbon atoms in the alkyl group and vinyl esters of carboxylic acids with 1 to 18 carbon atoms, such as vinyl acetate or vinyl stearate.

Specific examples of the copolymers to be hydrogenated include an acrylonitrile/iosprene copolymer, an acrylonitrile/isoprene/butadiene terpolymer, an acrylonitrile/isoprene/n-butyl acrylate terpolymer, an acrylonitrile/butadiene/methyl acrylate terpolymer, an acrylonitrile/butadiene/n-butyl acrylate terpolymer, an acrylonitrile/butadiene/2-hydroxypropyl methacrylate terpolymer and an acrylonitrile/butadiene/methacrylic acid terpolymer. An acrylonitrile/butadiene copolymer is particularly preferred.

The preparation of hydrogenated nitrile rubbers with the nitrile groups retained is known.

The degree of hydrogenation of the polymers (II) (percentage of hydrogenated C-C double bonds based on the total number of C-C double bonds originally present in the polymer) is determined by IR or NMR spectroscopy and is at least 80%, preferably at least 90% and in particular at least 95%.

The hydrogenated polymers (II) are gel-free and are soluble in ketones, such as acetone or butanone, in ethers, such as tetrahydrofuran or dioxane, or in chlorinated hydrocarbons, such as methylene chloride or chlorobenzene.

The moulding compositions of the present invention can be prepared by mixing the individual components on customary mixing units, such as roll mills, mixing extruders or internal kneaders. Additives which are required or are advantageous for the field of use, for example antioxidants, antistatics, lubricating agents, flameproofing agents, fillers and reinforcing substances and colouring agents, can be added to the moulding composition during mixing or at other points during working up, further processing and final moulding.

The moulding compositions can be moulded as thermoplastics on customary processing machines, for example by injection-moulding, sheet extrusion with subsequent thermal moulding or extrusion (for pipes and profiles). In particular, shaped articles can be produced by injection-moulding. Examples of shaped articles which can be produced are all types of housing components (for example for domestic appliances, such as coffee machines or mixers), covering plates for the building sector or components for the automobile sector.

Particle size alway denotes average particle diameter $d_{50}$, determined by ultracentrifuge measurement in accordance with the method of W. Scholtan, H. Lange: Kolloid-Z. u.Z. Polymere 250, pages 782-796 (1972).

EXAMPLES

Polymers used

A.

Graft polymer of 50% by weight of a styrene/acrylonitrile mixture (in a weight ratio of 72:28) on 50% by weight of polybutadiene in particle form with an average particle size ($d_{50}$) of 0.4 μm, obtained by emulsion polymerization.

B.

Styrene/acrylonitrile copolymer with a styrene : acrylonitrile weight ratio of 70:30 and a limiting viscosity of $[\eta]=0.72$ dl/g (measured in dimethylformamide at 20° C.). II.

Hydrogenated nitrile rubber obtained in accordance with the instructions in DE-OS (German Published Specification) 3,329,974, Example 1. A random acrylonitrile/butadiene copolymer with 34.9% by weight of acrylonitrile and a Mooney viscosity ML of $1+4/100°$ C. $=29$ was used for the dehydrogenation. The degree of hydrogenation was 99.7% (determined by infrared spectroscopy). V.

Random acrylonitrile/butadiene copolymer with an acrylonitrile content of 34.9% by weight and a Mooney viscosity ML $+4/100°$ C. of 29 as the comparison substance.

The moulding compositions according to the invention and the comparison materials are prepared by melt-compounding in an internal kneader, after addition of 2 parts by weight of pentaerythritol tetrastearate and 0.15 part by weight of a silicone oil (in each case per 100 parts by weight of polymer).

The moulding compositions were then injection-moulded to small standard bars and a sheet (for evaluation of the surface). The notched impact strength was determined at room temperature ($a_k$RT) and at $-40°$ C. ($a_k-40°$ C.) in accordance with DIN 53 453 (unit: kJ/m$^2$), the ball indentation hardness ($H_c$) was determined in accordance with DIN 53 456 (unit: N/mm$^2$), the heat distortion point (Vicat B) was determined in accordance with DIN 53 460 (unit: °C.) and the flow properties were determined by measuring the melt volume index MVI in accordance with DIN 53 735 U (unit: cm$^3$/10 min). The gloss measurement was carried out in accordance with DIN 67 530 on a flat sheet at an angle of reflection of 60° C. (reflectometer value) with the aid of a "Multi-Gloss" multi-angle reflectometer from Byk-Mallinckrodt.

The compositions of the moulding materials and the test data are summarized in Table 1.

We claim:

1. A thermoplastic moulding composition comprising
I. 75 to 99.5% by weight of
   A. 95% or less by weight of a graft copolymer prepared by graft polymerization of
      A.1 5 to 95% by weight of a mixture of
         A.1.1 50 to 95% by weight of styrene, α-methylstyrene, nuclear-substituted styrene, methyl methacrylate or mixtures thereof and
         A.1.2 50 to 5% by weight of (meth)acrylonitrile, methyl methacrylate, maleic anhydride, N-substituted maleimide or mixtures thereof on
      A.2 95 to 5% by weight of a rubber with a glass transition temperature, Tg, of $<0°$ C., and
   B. 100 to 5% by weight of a thermoplastic polymer of B.1 95 to 50% by weight of styrene, α-methylstyrene, nuclear-substitued styrene or methyl methacrylate or mixtures thereof and B.2 5 to 50% by weight of (meth)acrylonitrile, methyl methacrylate, maleic anhydride, N-substituted maleimide or mixtures thereof and II. 25 to 0.5% by weight of a hydrogenated nitrile rubber.

2. A moulding composition according to claim 1, consisting of 80 to 99% by weight of the polymer of component I. and 20 to 1% by weight of the rubber of component II.

3. A moulding composition according to claim 1, in which the copolymer of component I., consists of 5 to 80% by weight of the graft copolymer of component A and 95 to 20% by weight of the thermoplastic polymer of component B, the percentages by weight being relative to the total weight of components A and B.

4. A moulding composition according to claim 1, in which the polymer component B is a copolymer of styrene, α-methylstyrene, or mixtures thereof with acrylonitrile or a copolymer of styrene, α-methylstyrene or mixtures thereof with acrylonitrile and methyl methacrylate.

* * * * *